July 27, 1965 J. L. ANDERSON 3,197,653

RANDOM OR ASSOCIATIVE ACCESS MEMORY

Filed April 3, 1961 2 Sheets-Sheet 1

INVENTOR
JOHN L. ANDERSON

BY
Edward G. Firito
AGENT

July 27, 1965 J. L. ANDERSON 3,197,653

RANDOM OR ASSOCIATIVE ACCESS MEMORY

Filed April 3, 1961 2 Sheets-Sheet 2

United States Patent Office 3,197,653
Patented July 27, 1965

3,197,653

RANDOM OR ASSOCIATIVE ACCESS MEMORY

John L. Anderson, Poughkeepsie, N.Y., assignor to International Business Machines Corporation, New York, N.Y., a corporation of New York Filed Apr. 3, 1961, Ser. No. 100,395
5 Claims. (Cl. 307—88.5)

This invention relates to computer memories, and more particularly to random or associative access memories having a nondestructive read-out capability.

The present invention is directed to a new memory cell circuit capable of both destructive or nondestructive read-out and having great versatility of operation.

There are several types of operation of memories containing cells connected in a matrix fashion. Random access as used here is a type of operation wherein a selected column of cells in the memory matrix is read out by energizing a single drive line connecting the column of cells. The word random means that there is no constrained order in which columns must be chosen. Each cell in the chosen column provides a read-out signal. The present invention is capable of this type of operation.

Another type of operation which a memory can perform when using the memory cell circuit of the present invention is the associative access operation. Here a word, called an association word, consisting of a plurality of binary signals is desired to be matched with the word contained in the memory to determine whether the identical word is stored in the memory. This operation differs from random access in that each binary signal of the association word to be matched must be applied to memory as opposed to random access where only one signal is applied to a single column of cells. Where a different word is stored in each column of the memory matrix, each row of the matrix is sensed by one of the binary signals of the association word. A problem arises in determining whether all of the cells in a particular column match with the association word. Where the output of each cell in a column is connected to a single read-out line, positive and negative signals from the cells along the read-out line cancel each other. This has made it necessary to sense each cell in the column individually so that there is no overlap in time of the output from each cell. The present invention affords simultaneous read-out in the random access operation without the problem outlined above.

Another problem which arises when outputs of memory cells are joined to a common read-out line is that of isolation between the cells. It is undesirable to have the output signal of one cell enter another cell, since it may alter the information stored in that cell or provide spurious signals on the input and output terminals of that cell. The present invention provides for isolation between the cells.

The versatility of the memory cell embodying this invention is achieved without the necessity of a large number of components. It is economically advantageous to have only a small number of components in the memory cell since there are a large number of cells required to make the memory.

Accordingly, it is an object of the present invention to form a nondestructive memory capable of random or associative access operation.

Another object is to perform simultaneous read-out in the associative access operation.

A further object is to provide isolation between the memory cells.

The memory cell of the present invention can be adapted, with only a small increase in components, to permit read-out of the complement of the information stored in the memory. Frequently, operations within a computer require the complement as opposed to the true form of a word to be provided. Inverter circuits and other means of obtaining the complement form from the true form of a word are saved by this invention which can provide the complement form directly from the memory.

An additional object of the present invention is to provide the complement of the information stored in the memory.

Briefly, one memory cell embodying the present invention includes a bistable element. Two inputs are coupled to the element and are capable of switching it from one state to another. Read out is achieved by forward biasing a diode coupled to the element. The bistable element and diode are biased so that a signal on the input forward biases the diode only when the bistable element resides in one of the stable states. When the element resides in the other stable state the diode is reverse biased so that it provides isolation between the cells and the read-out line.

The foregoing and other objects, features, and advantages of the invention will be apparent from the following more particular description of the preferred embodiment of the invention as illustrated in the accompanying drawings.

In the dawings:

Figure 1:
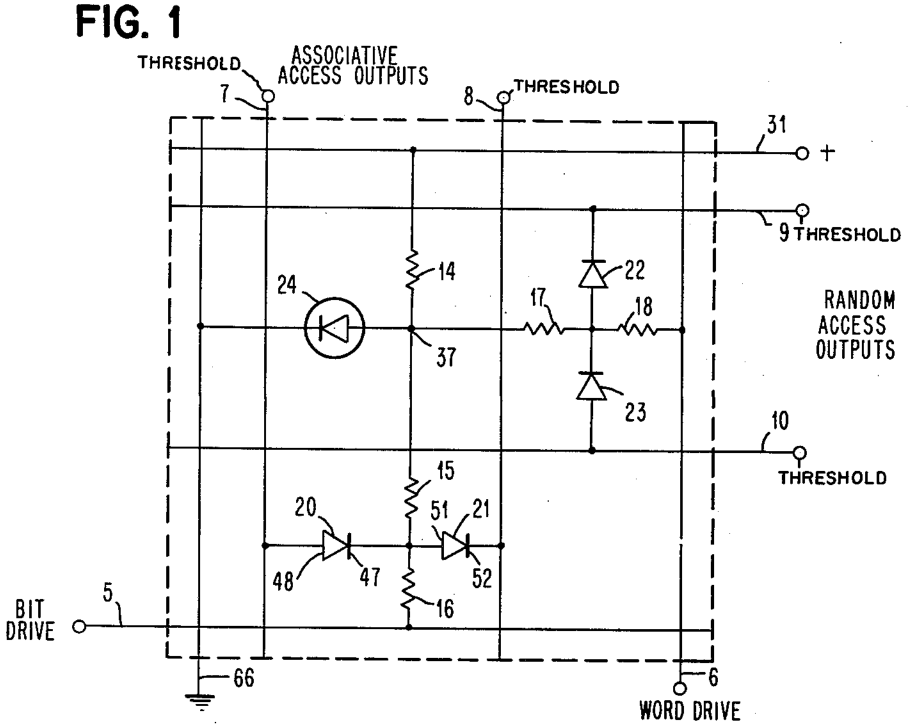
FIG. 1 is an electrical schematic of a circuit embodying the present invention.

The memory cell of FIG. 1 includes a bit drive 5 and a word drive 6. There are two sets of outputs, the associative access outputs 7 and 8, and the random access outputs 9 and 10. This memory cell may be used in a memory such as 3 by 3 matrix shown in FIG. 4. The bit drives *5a*, *5b*, and *5c* connect all of the cells in the same horizontal row. The word drives *6a*, *6b* and *6c* connect all of the cells in the same vertical column. The output lines *7a*, *b*, *c* through *10a*, *b*, *c* connect the cells in a similar fashion. As will become apparent the memory cell of FIG. 1 may be used in many other matrices in addition to that shown in FIG. 4. The bit and word drives 5 and 6 may be aligned along either the horizontal or vertical axis and one or more of the outputs 7 through 10 may be eliminated dependent upon the particular function desired to be performed by the memory.

Figure 2:
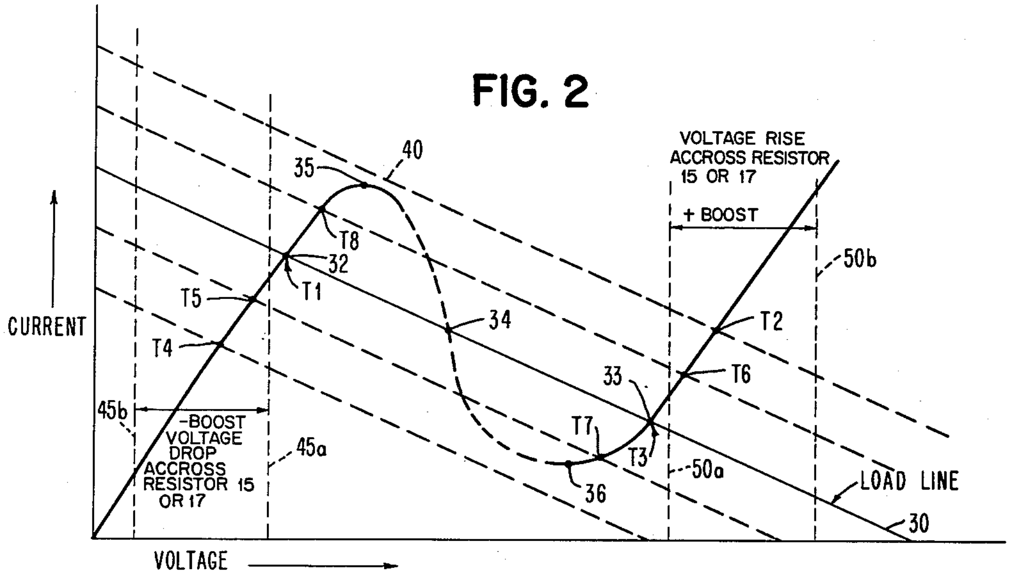
FIG. 2 is a current-voltage characteristic of a bistable circuit element.

The memory cell in FIG. 1 embodies the present invention. The components used in this embodiment are resistors 14 through 18, conventional diodes 20 through 23, and a bistable element 24. One preferred bistable element is the Esaki or tunnel diode described in an article "New Phenomenon In Narrow Germanium PN Junctions," Physical Review, vol. 109, 1958, pages 603 and 604, by L. Esaki. This element will be referred to as the Esaki diode. One reason why the Esaki diode is preferred is because of its high speed. However, many other bistable devices would perform satisfactorily in the present invention. Shown in FIG. 2 is a current-voltage characteristic curve of the Esaki diode 24. The load line 30 is formed by the resistor 14 and voltage supply on line 31. The two stable states of operation are at points 32 and 33. Point 34 is unstable because it is in the negative region of the characteristic curve, as represented by the dashed lines. The state represented by the point 32 is called the high conductivity state, while the state at point 33 is called the low conductivity state. The amount of current drawn by the Esaki diode 24 is indicative of the stable state in which it resides and is in turn indicative of the information stored in the memory cell. The stable state of the Esaki diode may be changed from the high conductivity state at point 32 to the low conductivity state of point 33 by forcing current through the Esaki diode in excess of that amount of current at point 35. Once the current through the Esaki diode exceeds that represented at point 35, the stable state switches rapidly to the stable state represented by the point 33. In a like manner, when the Esaki diode resides in the low conductivity state represented by point 33, it may be switched by decreasing the current supplied to the Esaki diode 24 below the amount represented by point 36, so that the state will switch to the high conductivity state of point 32.

Switching of the Esaki diode 24 in the memory cell of FIG. 1 is accomplished by simultaneously applying signals to the bit drive 5 and the word drive 6. When the Esaki diode resides in the high conductivity state at point 32, application of postiive half-select pulses on the drives 5 and 6 switch the Esaki diode to the point 33. These drive pulses are called half-select pulses because they supply about one-half of the necessary current required to switch the Esaki diode. The coupling network, composed of resistors 15 and 16, couples the bit drive 5 to the Esaki diode 24 through the junction 37. Resistors 17 and 18 couple the word drive 6 to the Esaki diode 24 through junction 37. The stable state of the Esaki diode 24 may be switched from the low conductivity state at point 33 to a high conductivity state at point 32 by applying negative half-select pulses simultaneously to the drives 5 and 6.

The dotted lines in FIG. 2 aid in describing the operation of the circuit in FIG. 1 during the application of pulses on the drives 5 and 6.

Figure 3:
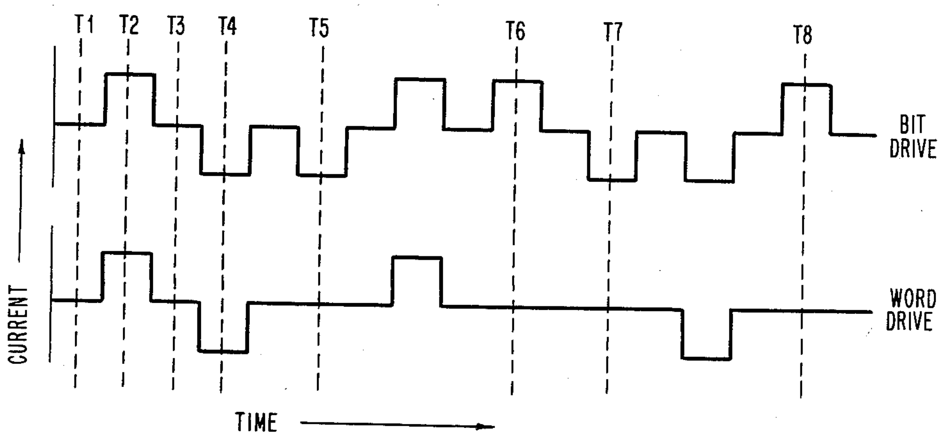
FIG. 3 is a diagram of input pulses to the electrical schematic shown in FIG. 1.

Shown in FIG. 3 are examples of a series of pulses applied to the bit and word drives 5 and 6. Assuming the Esaki diode is in the high conductivity state, at time T1, the voltage across the Esaki diode is represented by the point 32 in FIG. 2. At time T2, two positive half-select pulses are applied to the Esaki diode 24. This causes load line 30 to shift upward to the positions of the dotted line 40. At this time, the voltage across the Esaki diode is represented by the point T2 in FIG. 2. When the positive half-select pulses are removed at time T3, the voltage across the Esaki diode is represented by the point 33. Application of simultaneous negative half-select pulses to the drives 5 and 6 at time T4 switches the Esaki diode to the point T4. The resistor 14 and power supply on line 31 are designed to bias the Esaki diode 24 so that a single half-select pulse does not switch the Esaki diode, while two positive or negative half-select pulses are capable of switching the stable state of the Esaki diode 24.

Diodes 20–23 provide read-out from the memory cell when they are forward biased. The diode 20 may be forward biased when the Esaki diode is in the high conductivity state represented by point 32 by applying a negative half-select pulse to the bit drive 5. Associative access output 7 is connected to a threshold voltage represented by the line 45*b*. When the bit drive 5 is energized with a negative pulse, a voltage drop appears across the resistor 15. This voltage drop can be effectively represented by translating the line 45*b* to the position represented by line 45*a*. Therefore, at time T5, with a negative half-select pulse on bit drive 5, the voltage across the Esaki diode is represented by the point T5. The cathode 47, due to the negative boost of the voltage drop across the resistor 15, is at a lower potential than the threshold voltage connected to the anode 48. The diode 20 is forward biased and conducts current from the output line 7 to the bit drive line 5.

When the Esaki diode is in the low conductivity state, represented by the point 33, diode 21 can be forward biased by a positive half-select pulse applied to the bit drive 5. The output line 8 is connected to a threshold voltage represented by the line 50*b* in FIG. 2. When the positive pulse is applied to bit drive 5, a voltage increase appears across the resistor 15. This voltage increase can be effectively represented by translating the line 50*b* to the position represented by line 50*a*. The direction of translation is different from that in the case of a negative pulse applied to the bit drive 5 because the direction of current flow through resistor 15 is reversed. At time T6, when a positive pulse is applied to bit drive 5, the voltage across the Esaki diode 24 is represented by the point T6 in FIG. 2. At this time, the voltage on the anode 51, which equals the voltage across the Esaki diode plus the positive boost from the voltage across the resistor 15, is greater than the voltage of the threshold connected to the cathode 52. Therefore, the diode 21 is forward biased and a current flows from the bit drive 5 through the diode 21 to the output 8. It may be noted at time T6 that the cathode 47 of diode 20 is at a higher potential than the anode 48 connected to the threshold voltage represented by line 45*b* in FIG. 2. Therefore, the voltage on output line 7 is isolated from the memory cell.

When the Esaki diode is in the low conductivity state, represented by the point 33, application of a negative half-select pulse on the bit drive 5 produces no output on terminals 7 and 8. The voltage across the Esaki diode at time T7 in FIG. 3 is represented by the point T7 in FIG. 2. At this time, the anode 51 of diode 21 is at a lower potential than the cathode 52 connected to the threshold voltage represented by the line 50*b*. Therefore, the diode 21 is reverse biased. It may be noted at this time that an increase in voltage on output terminal 8 which may be caused by another memory cell connected to the line 8 increases the back bias on the diode 21 and line 8 remains isolated from this memory cell.

When the Esaki diode 24 resides in the high conductivity state, represented by point 32, application of a positive half-select pulse on bit drive 5 produces no output on terminals 7 and 8. At time T8 in FIG. 3, the voltage across the Esaki diode is shown by the point T8 in FIG. 2. The cathode 47 of diode 20 exceeds the potential of the anode 48 connected to the threshold voltage represented by line 45*b* and the diode 20 is reverse biased. Should another memory cell connected to the line 7 be providing a negative output, the diode 20 will be still further reverse biased, thereby isolating this memory cell from the line 7.

To summarize, the read-out operation places a further restriction upon the design of the resistor 14 and the power supply connected to line 31. The Esaki diode 24 must be biased so that, when in the high conductivity state represented by point 32, a negative pulse on bit drive 5 represented by point T5, causes the diode 20 to be forward biased and the diode 21 to be reverse biased, and when the Esaki diode 24 is in the low conductivity state represented by point 33, a positive pulse on bit drive 5 represented by point T6, causes the diode 21 to be forward biased and the diode 20 to be reverse biased.

Operation of the random access outputs 9 and 10 is identical to that of the associative access outputs 7 and 8 because the diodes 22 and 23, and coupling network (resistors 17 and 18) joined to junction 37 are identical to the diodes 20 and 21 and resistors 15 and 16 also joined to junction 37. It may be noted that the operation of the bit drive 5 is isolated from the outputs 9 and 10 by the resistors 15 and 17. For example, a positive pulse on bit drive 5, when the Esaki diode 24 is in the high conductivity state forward biases diode 21. However, a potential drop appears across resistor 15 and across resistor 17 so that the positive pulse on bit drive 5 is attenuated sufficiently to prevent diode 22 from being forward biased.

Drive lines in addition to 5 and 6 and outputs in addition to 7–10 could be added to the memory cell by joining additional coupling networks such as resistors 15 and 16 and diodes 20 and 21 to the junction 37. Each additional drive line provides output signals isolated from the other outputs coupled to the junction 37.

Figure 4:
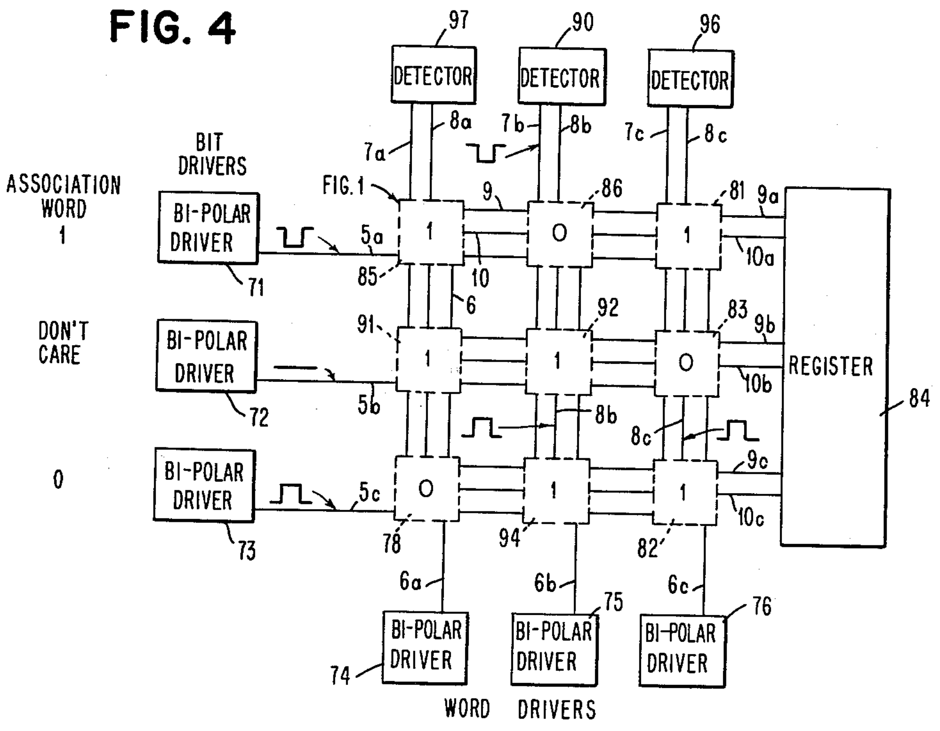
FIG. 4 is an electrical schematic of a memory matrix employing the electrical schematic of FIG. 1.

The memory matrix of Fig. 4 discloses the versatility of the memory cell shown in Fig. 1. In order to aid in describing the operation of this matrix, the high conductivity state represented by the point 32 in Fig. 2 is called the ZERO state, while the low conductivity state represented by the point 33 is called the ONE state. The bias line 31 and ground line 66 are not redrawn in the matrix of Fig. 4. The circuitry within each dashed block is identical to that shown in Fig. 1. The bipolar drivers 71–76 provide bipolar half-select pulses. The bipolar driver can set a memory cell in the ONE or the ZERO state by coincident positive or negative half-select pulses. For example, the memory cell 78 can be set in the ZERO state by applying simultaneous negative half-select pulses from the bipolar drivers 73 and 74.

Assuming each vertical column in the matrix contains one word, random access operation is achieved by activating one of the bipolar drivers 74–76. For example, if the memory cells are set in the state shown by the ONES and ZEROES within the dashed block of Fig. 4, a positive half-select pulse applied to the matrix by the bipolar driver 76 causes the diode 22 and the memory cells 81 and 82 to be forward biased, thereby providing a signal on output lines 9*a* and 9*c*. No signal is provided on output line 9*b* from memory cell 83 because the Esaki diode 24 is in the high conductivity state, or ZERO state. The signals are shown being placed into a register 84. This register can supply the threshold voltages represented by the lines 45*b* and 50*b* in FIG. 2.

The complement of the word stored in the column of cells 81 through 83 can be generated by activating the bipolar driver 76 to provide a negative half-select pulse. In this case, only the memory cell 83 provides a signal on output line 10*b*, while memory cells 81 and 82 provide no output signals.

In the associative access type of operation, the bipolar drivers 71–73 are activated. Assuming the first bit of the association word to be matched with the words contained in the memory is a ONE, the bipolar driver 71 is conditioned to provide a negative half-select pulse, such as that shown at the output of driver 71 in FIG. 4. If the next bit of the association word is not desired to be matched with the word in the memory ("don't care" bit), no pulse is provided by bipolar driver 72. Finally, if the last bit of an association word is a ZERO, a positive half-select pulse is provided by bipolar driver 73 shown at the output. Since memory cells 85 and 81 are in the ONE state, no output signals are provided on lines 7*a* and 7*c* or on lines 8*a* and 8*c*. However, memory cell 86, which is in the ZERO state, provides a signal as shown on line 7*b*. The detector 90 detects this signal and indicates that there is a mismatch between the word stored in this column and the association word.

Since bipolar driver 72 does not apply a pulse to the memory cells 91, 92, and 83, no output signals are generated. Bipolar driver 73 provides a positive half-select pulse. Outputs are provided by memory cells 94 and 82, as shown on lines 8*b* and 8*c*. Detector 96 records a mismatch in the column containing cells 81–83, and detector 90 records a mismatch in the column containing cells 86, 92, and 94. It may be noted that, although detector 90 receives a negative signal on output line 7*b* and a positive on output line 8b, no cancellation of these signals occurs since the positive and negative signals are separated into two output lines. Therefore, simultaneous interrogation of the memory can be achieved in the associative access operation without the problem of cancellation of positive and negative signals on the same output line.

Detector 97 records no output on lines 7*a* and 8*a*. Therefore, it is determined that this column contains a word having bits identical to the bits to be matched in the association word. The detectors 90, 96, and 97 provide the threshold voltages 45*b* and 50*b* for the output lines 7 and 8.

While the invention has been particularly shown and described with reference to a preferred embodiment thereof, it will be understood by those skilled in the art that various changes in form and details may be made therein without departing from the spirit and scope of the invention.

I claim:

1. A memory cell adapted for nondestructive read-out comprising: a bipolar driver circuit; a first and a second read-out circuit having a first and a second threshold signal level respectively; a bistable circuit element; a coupling network including two series resistors connected between said bipolar driver and said element; a first diode connected between said first read-out circuit and a point intermediate said two resistors; a second diode connected between said second read-out circuit and said intermediate point; biasing means connected at the junction of said coupling network and said element for biasing said element and said diodes so that a positive signal exceeding said first threshold from said bipolar driver passes through said first diode to said first read-out circuit only when said element resides in one of said stable states and a negative signal less than said second threshold on said driver passes through said second diode to said second read-out circuit only when said element resides in the other state.

2. A memory cell capable of storing signals indicative of binary ONE and binary ZERO and of providing a nondestructive read-out signal comprising: a first and a second driver circuit; a read-out circuit having a first positive threshold signal level; a bistable circuit element; a first coupling network including two series resistors connected between said first driver and said element; a second coupling network including a resistor connected between said second driver and the junction of said first coupling network and said element; a diode connected between said read-out circuit and a point intermediate the two resistors in said first coupling network; a positive biasing means connected to said junction supplying a signal level to said junction less than the level of the first threshold for biasing said element and said diode so that simultaneous positive signals from said driver circuits set said element in one of said stable states, so that simultaneous negative signals from said driver circuits set said element in the other stable state, so that a positive signal exceeding said positive threshold on said first driver passes through said diode to said read-out circuit only when said element resides in a first of said stable states, and so that said read-out circuit is isolated from said element by said diode when said element resides in the other of said stable states.

3. A memory cell capable of storing signals indicative of binary ONE and binary ZERO and of providing a nondestructive read-out signal comprising: a first and a second driver circuit; a first and a second read-out circuit having a first positive and second less positive threshold signal level respectively; a bistable circuit element having a first and a second stable state, said second stable state being at a lower signal level than said first stable state; a first coupling network including two series resistors connected between said first driver and said element; a second coupling network including a resistor connected between said second driver and the junction of said first coupling network and said element; a first diode connected between said first read-out circuit and a point intermediate said two series resistors in said first coupling network, said first diode being oriented to conduct signals into said first read-out circuit; a second diode connected between said second read-out circuit and a point intermediate said two series resistors in said first coupling network, said second diode being oriented to conduct signals away from said second read-out circuit;

a positive biasing means connected to said junction supplying a signal level at said junction intermediate said first and second thresholds for biasing said element and said diodes so that simultaneous positive signals from said driver circuits set said element in said first stable state, so that simultaneous negative signals from said driver circuits set said element in said second stable state, so that a positive signal exceeding said first threshold from said first driver passes through said first diode to said first read-out circuit only when said element resides in said first stable state, and a negative signal less than said second threshold from said first driver passes through said second diode and conducts signals away from said second read-out circuit only when said element resides in said second stable state.

4. A memory cell adapted for a nondestructve read-out comprising: a drive circuit; a read-out circuit having a certain threshold signal level; a bistable circuit element; a coupling network including two series resistors connected between said driver and said element; a diode connected between said read-out circuit and a point intermediate said two series resistors; biasing means connected at the junction of said coupling network and said element for biasing said element and said diode so that a signal exceeding said threshold on said driver passes through said diode to said read-out circuit only when said element resides in one of said stable states and said read-out circuit is isolated from said element by said diode when said element resides in the other of said stable states; a second driver circuit; a second read-out circuit; a second coupling network including two series resistors connected between said driver and said junction; and a second diode connected between said second read-out circuit and a point intermediate said two series resistors in said second coupling network, whereby the resistors in said two coupling networks provide isolation between said second driver and said first mentioned read-out circuit and between said first mentioned driver and said second read-out circuit.

5. A memory cell capable of storing signals indicative of binary ONE and binary ZERO and of providing a nondestructive read-out signal comprising: a first and a second driver circuit; a read-out circuit having a first positive threshold signal level; a bistable circuit element; a first coupling network including two series resistors connected between said first driver and said element; a second coupling network including a resistor connected between said second driver and the junction of said first coupling network and said element; a diode connected between said read-out circuit and a point intermediate the two resistors in said first coupling network; a positive biasing means connected to said junction supplying a signal level to said junction less than the level of the first threshold for biasing said element and said diode so that simultaneous positive signals from said driver circuit set said element in one of said stable states, so that simultaneous negative signals from said driver circuit set said element in the other stable state, so that a positive signal exceeding said positive threshold on said first driver passes through said diode to said read-out circuit only when said element resides in a first of said stable state and so that said read-out circuit is isolated from said element by said biasing means; and a second diode connected said stable states; a second read-out circuit having a second threshold signal level lower than the level supplied by said biasing means; and a second diode connected between said second read-out circuit and said intermediate point, said second diode being orientated to conduct signals away from said second read-out circuit, whereby a negative signal on said first driver passes through said second diode and conducts signals away from said second read-out circuit only when said element resides in said other stable state, and said second read-out circuit is isolated from said element by the reverse bias of said second diode when said element resides in said first stable state.

References Cited by the Examiner

UNITED STATES PATENTS

| | | | |
|---|---|---|---|
| 2,673,936 | 3/54 | Harris | 307—88.5 |
| 3,107,345 | 10/63 | Gruodis | 307—88.5 X |

JOHN W. HUCKERT, *Primary Examiner.*